(12) United States Patent  (10) Patent No.: US 9,081,951 B2
Sondhi et al.  (45) Date of Patent: Jul. 14, 2015

(54) MOBILE APPLICATION, IDENTITY INTERFACE

(75) Inventors: Ajay Sondhi, San Jose, CA (US);
Ching-Wen Chu, San Jose, CA (US);
Beomsuk Kim, San Jose, CA (US);
Sean Brydon, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 176 days.

(21) Appl. No.: 13/485,509

(22) Filed: May 31, 2012

(65) Prior Publication Data

US 2013/0086639 A1  Apr. 4, 2013

Related U.S. Application Data

(60) Provisional application No. 61/541,034, filed on Sep. 29, 2011.

(51) Int. Cl.
*H04L 29/06* (2006.01)
*G06F 21/41* (2013.01)

(52) U.S. Cl.
CPC ............ *G06F 21/41* (2013.01); *H04L 63/0815* (2013.01)

(58) Field of Classification Search
CPC .......................... H04L 63/0815; G06F 21/41
USPC .......................................................... 726/4
See application file for complete search history.

(56) References Cited

U.S. PATENT DOCUMENTS

| | | | |
|---|---|---|---|
| 6,092,196 A | 7/2000 | Reiche | |
| 6,092,204 A | 7/2000 | Baker | |
| 6,516,416 B2 | 2/2003 | Gregg et al. | |
| 7,290,288 B2 | 10/2007 | Gregg et al. | |
| 7,500,262 B1 | 3/2009 | Sanin et al. | |
| 7,631,346 B2 | 12/2009 | Hinton et al. | |
| 7,721,329 B2 | 5/2010 | Toomey | |
| 8,225,385 B2 | 7/2012 | Chow et al. | |
| 8,281,149 B2 | 10/2012 | Laurie et al. | |
| 8,296,784 B1 * | 10/2012 | Brown et al. | ............. 719/328 |
| 8,316,424 B2 | 11/2012 | Henry et al. | |

(Continued)

FOREIGN PATENT DOCUMENTS

WO  2013/049392 A1  4/2013

OTHER PUBLICATIONS

International Application No. PCT/US2012/057622, International Search Report and Written Opinion mailed on Dec. 3, 2012, 12 pages.

(Continued)

*Primary Examiner* — Longbit Chai
(74) *Attorney, Agent, or Firm* — Kilpatrick Townsend and Stockton LLP

(57) ABSTRACT

Techniques for managing identities are provided. In some examples, identity management, authentication, authorization, and token exchange frameworks may be provided for use with mobile devices, mobile applications, cloud applications, and/or other web-based applications. For example a mobile client may request to perform one or more identity management operations associated with an account of a service provider. Based at least in part on the requested operation and/or the particular service provider, an application programming interface (API) may be utilized to generate and/or perform one or more instructions and/or method calls for managing identity information of the service provider.

19 Claims, 13 Drawing Sheets

(56) References Cited

U.S. PATENT DOCUMENTS

| | | |
|---|---|---|
| 8,621,561 B2 | 12/2013 | Cross et al. |
| 2005/0124320 A1 | 6/2005 | Ernst et al. |
| 2006/0031683 A1 | 2/2006 | Marion et al. |
| 2006/0236382 A1 | 10/2006 | Hinton et al. |
| 2006/0294196 A1 | 12/2006 | Feirouz et al. |
| 2007/0006299 A1 | 1/2007 | Elbury et al. |
| 2007/0055703 A1 | 3/2007 | Zimran et al. |
| 2008/0059804 A1 | 3/2008 | Shah et al. |
| 2008/0171541 A1 | 7/2008 | Dahlin et al. |
| 2009/0113024 A1 | 4/2009 | Verma et al. |
| 2009/0113527 A1 | 4/2009 | Naaman et al. |
| 2009/0217367 A1 | 8/2009 | Norman et al. |
| 2009/0235349 A1 | 9/2009 | Lai et al. |
| 2009/0292927 A1 | 11/2009 | Wenzel et al. |
| 2010/0146394 A1 | 6/2010 | Morris |
| 2010/0162124 A1 | 6/2010 | Morris |
| 2011/0041171 A1 | 2/2011 | Burch et al. |
| 2011/0209202 A1 | 8/2011 | Otranen |
| 2011/0264913 A1 | 10/2011 | Nikander et al. |
| 2012/0036563 A1 | 2/2012 | Glasgow et al. |
| 2012/0054625 A1 | 3/2012 | Pugh et al. |
| 2012/0078944 A1 | 3/2012 | Lloyd et al. |
| 2012/0151568 A1 | 6/2012 | Pieczul et al. |
| 2012/0174196 A1 | 7/2012 | Bhogavilli et al. |
| 2012/0226908 A1 | 9/2012 | Mokrushin et al. |
| 2012/0254957 A1 | 10/2012 | Fork et al. |
| 2012/0265997 A1 | 10/2012 | Laurie et al. |
| 2013/0007456 A1 | 1/2013 | Dean et al. |
| 2013/0055243 A1 | 2/2013 | Dandekar et al. |
| 2013/0086210 A1 | 4/2013 | Yiu et al. |
| 2013/0086211 A1 | 4/2013 | Sondhi et al. |
| 2013/0086639 A1 | 4/2013 | Sondhi et al. |
| 2013/0086669 A1 | 4/2013 | Sondhi et al. |
| 2013/0125226 A1 | 5/2013 | Shah et al. |
| 2013/0174241 A1 | 7/2013 | Cha et al. |
| 2014/0089661 A1 | 3/2014 | Mahadik et al. |

OTHER PUBLICATIONS

Final Office Action for U.S. Appl. No. 13/485,283 dated Jul. 30, 2014, 14 pages.
Non-Final Office Action for U.S. Appl. No. 13/485,569 dated May 28, 2014, 10 pages.
Non-Final Office Action for U.S. Appl. No. 13/485,420 dated Jul. 9, 2014, 17 pages.
U.S. Appl. No. 13/485,283, "Non-Final Office Action", Feb. 7, 2014, 14 pages.
PCT/US2012/057622, International Preliminary Report on Patentability, Apr. 10, 2014, 10 pages.
Non-Final Office Action for U.S. Appl. No. 13/485,283 mailed on Dec. 29, 2014, 14 pages.
Final Office Action for U.S. Appl. No. 13/485,569 mailed on Jan. 29, 2015, 10 pages.

* cited by examiner

MOBILE APPLICATION, IDENTITY INTERFACE

CROSS REFERENCES TO RELATED APPLICATIONS

The present application is a non-provisional of and claims the benefit and priority under 35 U.S.C. 119(e) of U.S. Provisional Application No. 61/541,034 filed Sep. 29, 2011 entitled "MOBILE SECURITY AND SINGLE SIGN-ON, the entire contents of which are incorporated herein by reference for all purposes. This application is also related to application Ser. No. 13/485,283, filed on the same day herewith, entitled "MOBILE APPLICATION, SINGLE SIGN-ON MANAGEMENT," application Ser. No. 13/485,420, filed on the same day herewith, entitled "MOBILE APPLICATION, IDENTITY RELATIONSHIP MANAGEMENT," and application Ser. No. 13/485,569, filed on the same day herewith, entitled "MOBILE APPLICATION, RESOURCE MANAGEMENT ADVICE," the entire contents of each is hereby incorporated by reference as if fully set forth herein, under 35 U.S.C. §120.

BACKGROUND

Modern enterprise computing solutions often deploy one or more different access management and/or identity services for allowing authentication, authorization, token exchanges, identity management, etc. Additionally, different access management and/or identity services are accessible via different methods and/or utilizing different application programming interfaces (APIs). However, such APIs may not be configured for interaction with external entities, such as mobile devices or cloud applications, over the Internet. Additionally, such external entities may not be natively capable of interacting with enterprise computing solutions and/or their deployed access management and/or identity management systems. As such, finding improved ways to manage identities continues to be a priority.

BRIEF SUMMARY

Techniques for managing identities are provided. In some examples, identity management, authentication, authorization, and token exchange frameworks may be provided for use with mobile devices, mobile applications, cloud applications, and/or other web-based applications. For example a mobile client may request to perform one or more identity management operations associated with an account of a service provider. Based at least in part on the requested operation and/or the particular service provider, an application programming interface (API) may be utilized to generate and/or perform one or more instructions and/or method calls for managing identity information of the service provider.

According to at least one example, a system may receive a request to perform a function associated with a service provider. The request may be received from a client application and may be formatted as a representational state transfer (REST) call. Additionally, the system may also determine an access management service call corresponding to the service provider for which performance of the function is being requested. Further, the system may perform the access management service call.

In one example, the client application from which the request is received may be implemented as a mobile application of a mobile device, a software as a service (SaaS) application, and/or a Rich Internet Application (RIA). Additionally, in some examples, the request to perform the function associated with the service provider may include an authorization request. The authentication request may include a user identifier (ID) of a user of the client application. The authentication request may also include a password of the user and/or a client token used to indicate that the client application has been authenticated. The user ID and the password may, in some cases, be used to authenticate the user with the access management service.

In one example, the access management service call performed by the system may include a method call to implement a token exchange.

Additionally, in some examples, the request to perform the function associated with the service provider may include an access request. The access request may, in some cases, include a client token indicating that the client is authenticated, a user token indicating that the user is authenticated, and/or an indication of the service provider for which access is being requested. In some cases, the system may receive an indication that the user and/or the client application have been granted access to the service provider by the access management service. In this case, the system may then provide an access token to the client application.

In one example, service calls for a first access management service may be different from service calls for a second access management service. Further, in some cases, the access management service to be utilized may be specified by the service provider, but not indicated to the client application. In this way, the client application can make REST calls independent of the API or other configuration of the service provider.

According to at least one example, a system may receive an instruction to manage an identity. The system may also be configured to model an identity relationship, associated with the identity that is to be managed, as a uniform resource identifier (URI). The system may also map the URI to a schema associated with a service provider and/or transmit the schema to the service provider for managing the identity as requested.

In some examples, the received instruction to manage an identity may be received by a mobile client application, an RIA, or a SaaS application. The received instruction may also be formatted as a REST call. Additionally, in some aspects, the modeled identity relationship may include the identity to be managed and/or an association between the identity and another entity. Further, the identity relationship may be modeled as a URI based at least in part on a string of characters including the identity and the association.

Techniques for managing single sign-on are also provided. In some examples, single sign-on functionality may be provided for use on mobile devices by utilizing mobile applications, cloud applications, and/or other web-based applications. For example, a mobile application or mobile web browser may request to authenticate with or access one or more service providers. Authentication credentials may be requested from a user of the mobile device to facilitate such authentication and/or access. Based at least in part on a successful log-in, access to server resources from other applications on the same mobile device may be provided without successive or repetitive credential requests to the user.

According to at least one example, a computer readable memory may store instructions that, when executed by one or more processors, cause the one or more processors to receive one or more requests to access a service provider. In some examples, the requests may be received from a first application of the mobile device. Additionally, the instructions may also cause the one or more processors to log in a user associated with the first application. The instructions may further cause the one or more processors to provide a token for accessing the service provider to the first application. A second token may then be provided to a second application.

In some examples, the first application may be configured as an application agent for providing single sign-on functionality for the second application. Additionally, in some examples, the second application may be configured as a web browser application or a native application.

In one example, the first application may be configured as a browser application associated with a web service while the second application may be configured as a native application associated with an application service provider. The browser application and the native application may be executed or otherwise hosted by a mobile device.

In some examples, the first application may be configured as a native application of a mobile device. The native application may be associated with an application service provider. Additionally, the second application may be configured as a browser application associated with a web application. The browser application may be executed or otherwise hosted by a mobile device. Further, in some examples, the second application may be configured as a second native application associated with a second application service. The second native application may also be executed or otherwise hosted by the mobile device.

In one example, a log-in of the user may include an authentication of the user with an authentication service that utilizes a representational state transfer (REST) call. In another example, a second token provided to a second application may enable the second application to log in to an application service provider associated with the second application without the user providing log-in credentials to the application service provider associated with the second application.

Techniques for a resource management advice service are also provided. In some examples, resource management advice and/or instructions may be provided for use with mobile devices, mobile applications, cloud applications, and/or other web-based applications. For example, a mobile client may request to perform one or more resource management operations associated with a service provider. Based at least in part on the requested operation and/or the particular service provider, advice and/or instructions for managing the resource may be provided.

According to at least one example, a computer readable memory may store instructions that, when executed by one or more processors, cause the one or more processors to receive a request to manage a secure resource of a service provider. The request may be received from a client application and may be formatted as a representational state transfer (REST) call. Additionally, the instructions may also cause the one or more processors to determine an acquisition path for performing the management of the secure resource. The instructions may further cause the one or more processors to generate an instruction set for following the acquisition path. The instruction set may include at least one instruction. Further, the instructions may cause the one or more processors to transmit the instruction set to the client application.

In one example, the client application from which the request is received may be implemented as a mobile application of a mobile device, a software as a service (SaaS) application, and/or a Rich Internet Application (RIA). Additionally, in some examples, the request to manage the secure resource may include a request to access the secure resource, a request to update the secure resource, or a request to delete the secure resource. The secure resource may include profile information associated with a user of the client application, payroll information associated with a user of the client application, or social information associated with a user of the client application. The generated instruction may, in some cases, be protected by a security filter. In some aspects, the acquisition path may be determined dynamically based at least in part on the secure resource and/or a change associated with the secure resource.

In one example, the instructions may cause the one or more processors to receive, based at least in part on the transmitted instruction set, an authentication request from the client application. The instructions may also cause the one or more processors to provide, based at least in part on the authentication request, an authentication token to the client application.

Additionally, in some examples, the instructions may cause the one or more processors to determine a second acquisition path for performing the management of the secure resource, generate a second instruction set, and transmit the second instruction set to the client.

The foregoing, together with other features and embodiments will become more apparent upon referring to the following specification, claims, and accompanying drawings.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
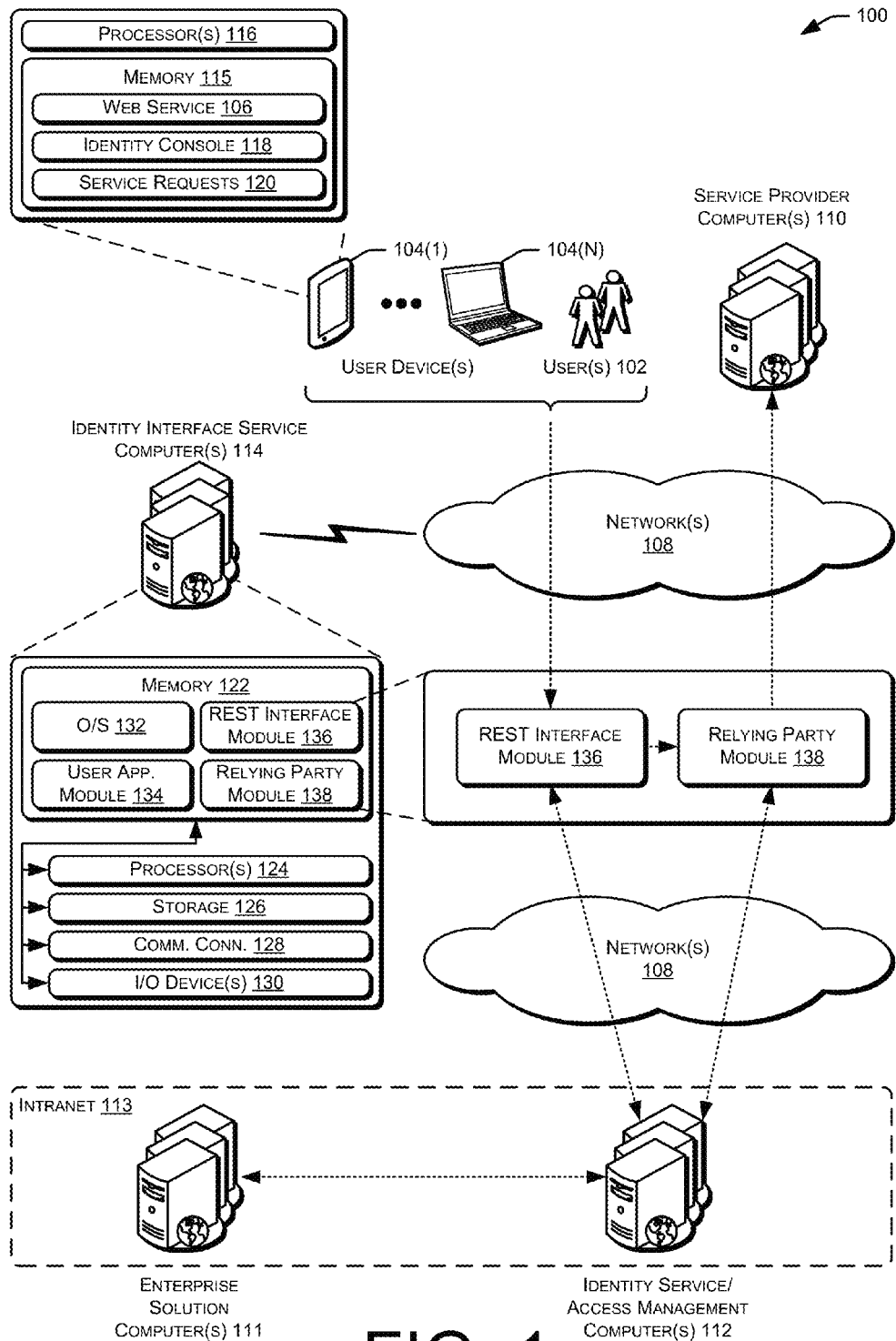
FIG. 1 is a simplified block diagram illustrating an example architecture for managing identities that includes one or more identity service computers, one or more user devices, and one or more other computing solutions, connected via one or more networks, according to at least one example.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, providing identity management services to one or more entities (e.g., external computing entities and/or enterprise computing entities) via a computing resource and/or identity interface service computing system. As used herein, an identity interface service may include one or more computing systems for providing a pluggable interface layer between client applications and other service providers. For example an identity interface service may receive identity management instructions from client applications (e.g., mobile applications of mobile devices, SaaS applications, RIAs, combinations of the foregoing, or the like) and provide appropriately translated instructions to one or more service providers, identity providers, and/or access management providers.

In some aspects, the identity interface service may provide the ability for mobile applications to perform authentication, authorization, auditing, token services, user profile management, password management, and/or ID management. Additionally, these services may be exposed or otherwise provided to the mobile applications or other external client applications that may not natively be able to interact with such services (e.g., services deployed by or within an enterprise solution). In one example, the identity interface service may provide a REST interface to the client applications to allow their communication of identity management requests to an identity service. In this way, the client applications may utilize their native Internet-based operations such as those utilizing, but not limited to, the hypertext transfer protocol (HTTP) and/or hypertext markup language (HTML). Further, the identity interface service may al low plug-in capabilities for the service providers including, but not limited to, enterprise solutions, identity services, access management services, and/or other identity-related solutions. For example, an identity service of an enterprise solution may plug in to the identity interface service to allow for secure interaction with a client application from which it would not ordinarily be able to receive instructions and/or requests. RESTful APIs may be provided for such service providers and, in some examples, security models may be provided for securing the RESTful APIs.

In one non-limiting example, the identity interface service may receive one more identity propagation and/or token exchange requests from a client application attempting to access a service provider. The request may be received in REST format (i.e., as a REST call) and may indicate that the client application has been authenticated. The identity interface service may, based at least in part on the service provider (e.g., an access management service of an enterprise solution), determine an appropriate identity propagation and/or token exchange instruction to be performed. The identity interface service may then perform the instruction in order to provide appropriate access tokens to the client application. Alternatively, or in addition, the identity interface service may format the instruction, based at least in part on an API of the service provider, in such a way that the service provider may be able to perform the instruction. The identity interface service may then transmit the formatted instruction or instructions to the service provider. The service provider may then perform the instructions and, in some cases, provide the appropriate access token to the identity interface service. In this way, the client application may be provided with appropriate access tokens for accessing the service provider (e.g., assuming the client application and the user are granted access) without directly communicating with the service provider, and without knowledge of particular and/or proprietary APIs of the service provider. While this example describes identity propagation (i.e., replicating authenticated identities through multiple systems) and/or token exchange (i.e., providing access tokens based on prior authentication), the identity interface service may be configured as described above for implementing other services as well, including, but not limited to, authentication, authorization, auditing, profile management, password management, ID management, etc.

For example, the identity interface service may also be configured to receive and/or process requests, from client applications, to manage identity relationships. As used herein, an identity relationship may include a logical assertion between people (e.g., employees, partners, customers, contractors, etc.) based at least in part on a set of one or more criteria. For example, a lightweight directory access protocol (LDAP) group may establish relationships between members of a group. Additionally, an Org chart may describe how relationships between individuals get established based at least in part on criteria such as, but not limited to, "peer," "reports-to," etc. Similarly, these identity relationship management requests may also be received as REST calls. That is, mobile applications and/or other external client applications may be configured to follow one or more RESTful APIs provided by the identity interface service to make identity management requests. The identity interface service may then determine, based at least in part on the request and the service provider that manages the identity information for which the request is being made, an appropriate instruction or set of instructions to be sent to the service provider. In this way, service providers may plug in to the identity interface service independent of which client applications will be calling. Additionally, client applications may make identity relationship management requests to the identity interface service independent of which type and/or particular service provider actually manages the identity information.

This brief introduction, including section titles and corresponding summaries, is provided for the reader's convenience and is not intended to limit the scope of the claims, nor the preceding sections. Furthermore, the techniques described above and below may be implemented in a number of ways and in a number of contexts. Several example implementations and contexts are provided with reference to the following figures, as described below in more detail. However, the following implementations and contexts are but a few of many.

Illustrative Architecture

FIG. 1 depicts a simplified example system or architecture 100 in which techniques for providing an identity interface and/or identity interface service may be implemented. In architecture 100, one or more users 102 (i.e., account holders) may utilize user computing devices 104(1)-(N) (collectively, user devices 104) to access a web service application 106, or a user account accessible through the web service application 106, via one or more networks 108. In some aspects, the web service application 106 and/or user account may be hosted, managed, and/or provided by a computing resources service or service provider, such as by utilizing one or more service provider computers 110. The one or more service provider computers 110 may, in some examples, provide computing resources and/or services such as, but not limited, web services, data storage, email, identity management, authorization and/or authentication services, or the like. In some aspects, the service provider computers may implement an enterprise solution, such as by utilizing one or more enterprise solution computers 111. The one or more service provider computers 110 may also be operable to provide web hosting, application development platforms, implementation platforms, or the like to the one or more users 102.

The one or more service provider computers 110 and/or enterprise solution computers 111 may also deploy or otherwise utilize one or more proprietary or third-party identity services, access management services, or other services via the identity service/access management computers 112 shown in FIG. 1. In some examples, the identity service/access management computers 112 may be part of or otherwise integrated with the enterprise solutions computers 111 to form an intranet system 113. In this way, the identity service/access management computers 112 may not be externally facing to the Internet without the assistance of some sort of additional interface such as, but not limited to an identity interface service hosted by one or more identity interface service computers 114. As such, in some cases, the user devices 104, the service provider computers 110 and/or enterprise solution computers 111 (which in some examples are the same system), the identity service/access management computers 112, and/or the identity interface service computers 114 may each be accessible by one another via the one or more networks 108.

In some examples, the networks 108 may include any one or a combination of multiple different types of networks, such as cable networks, the Internet, wireless networks, cellular networks, intranet systems, and/or other private and/or public networks. While the illustrated example represents the users 102 accessing the web service application 106 over the networks 108, the described techniques may equally apply in instances where the users 102 interact with a service provider computer 110 via the one or more user devices 104 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

The web service application 106 may allow the users 102 to interact with the service provider computers 110, such as to store, access, and/or manage data, develop and/or deploy computer applications, and/or host web content. The one or more service provider computers 110, perhaps arranged in a cluster of servers or as a server farm, may host the web service application 106. Other server architectures may also be used to host the web service application 106. The web service application 106 may be capable of handling requests from many users 102 and serving, in response, various user interfaces that can be rendered at the user devices 104. The web service application 106 can be any type of website that supports user interaction, including social networking sites, online retailers, informational sites, blog sites, search engine sites, news and entertainment sites, and so forth. Additionally, the described techniques can similarly be implemented outside of the web service application 106.

As noted above, the architecture 100 may include one or more user devices. The user devices 104 may be any type of computing device such as, but not limited to, a mobile phone, a smart phone, a personal digital assistant (PDA), a laptop computer, a desktop computer, a thin-client device, a tablet PC, etc. In some examples, the user devices 104 may be in communication with the service provider computers 110 via the networks 108, or via other network connections. Further, the user devices 104 may also be configured to implement one or more mobile application, RIAs, or SaaS applications. In some examples, however, these client applications may not be able to communicate with the service provider computers 110 and/or enterprise solution computers 111 (e.g., when trying to access one or more identity services and/or access management services that are not externally facing). However, in some cases, the client applications may be able to communicate or otherwise interact with the identity service/access management computers 112 by sending requests to the identity interface service computers 114. In this way, the identity interface service computers 114 may act as an interface layer between the client application of the user devices 104 (e.g., mobile devices) and the identity service/access management computers 112 of the enterprise solutions and/or service providers.

In one illustrative configuration, the user devices 104 may include at least one memory 115 and one or more processing units (or processor(s)) 116. The processor(s) 116 may be implemented as appropriate in hardware, computer-executable instructions, firmware, or combinations thereof. Computer-executable instruction or firmware implementations of the processor(s) 116 may include computer-executable or machine-executable instructions written in any suitable programming language to perform the various functions described.

The memory 115 may store program instructions that are loadable and executable on the processor(s) 116, as well as data generated during the execution of these programs. Depending on the configuration and type of user device 104, the memory 115 may be volatile (such as random access memory (RAM)) and/or non-volatile (such as read-only memory (ROM), flash memory, etc.). The user device 104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 115 may include multiple different types of memory, such as static random access memory (SRAM), dynamic random access memory (DRAM), or ROM.

Turning to the contents of the memory 115 in more detail, the memory 115 may include an operating system and one or more application programs or services for implementing the features disclosed herein including at least an identity console 118, such as a Web browser or dedicated application (e.g., a smart phone application, a tablet application, etc.) and/or the web service application 106. The identity console 118 may be configured to receive, store, and/or display a website or other interface for interacting with the identity interface service computers 114. Additionally, the memory 115 may store access credentials and/or other user information such as, but not limited to, user IDs, passwords, other user information, and/or service requests 120 to be sent to the service provider computers 110 and/or identity interface service computers 114. In some examples, the other client information may include information for authenticating an account access request such as, but not limited to, a device ID, a cookie, an IP address, a location, or the like. In addition, the other client information may include a user 102 provided response to a security question or a geographic location obtained by the user device 104. Further, the service requests 120 may include requests to update and/or manage identities, requests to access one or more service providers, requests to authenticate or authorize the user 102, etc.

Additionally, in some aspects, the identity console 118 may allow a user 102 to interact directly with the identity interface service computers 114. For example, the user devices 104 may make access, service, and/or identity management requests to the identity interface service computers 114 via the identity console 118. In some examples, the requests sent to the identity interface service computers 114 may be formatted as REST calls that were predefined and/or exposed by the identity interface service computers 114. Also utilizing the identity console 118, in some examples, a user may make requests for accessing the service provider computers 110 and/or enterprise solution computers 111. Further, the identity console 118 may also be utilized for making identity relationship management requests to the service provider computers 110 and/or enterprise solution computers 111. In some cases, each of these requests may be received by the identity interface service computers 114, as REST calls, and translated or otherwise utilized to generate one or more requests and/or instructions for the service provider computers 110 and/or enterprise solution computers 111.

In some aspects, the identity interface service computers 114 may also be any type of computing devices such as, but not limited to, mobile, desktop, thin-client, and/or cloud computing devices, such as servers. In some examples, the identity interface service computers 114 may be in communication with the user devices 104 via the networks 108, or via other network connections. The identity interface service computers 114 may include one or more servers, perhaps arranged in a cluster, as a server farm, or as individual servers not associated with one another. These servers may be configured to host features described herein including, but not limited to, the identity interface service. Additionally, in some aspects, the identity interface service computers 114 may be configured as part of an integrated, distributed computing environment.

In one illustrative configuration, the identity interface service computers 114 may include at least one memory 122 and one or more processing units (or processor(s)) 124. The processor(s) 124 may be implemented as appropriate in hardware, computer-executable instructions, firmware, or combinations thereof. Computer-executable instruction or firmware implementations of the processor(s) 124 may include computer-executable or machine-executable instructions written in any suitable programming language to perform the various functions described.

The memory 122 may store program instructions that are loadable and executable on the processor(s) 124, as well as data generated during the execution of these programs. Depending on the configuration and type of identity interface service computers 114, the memory 122 may be volatile (such as random access memory (RAM)) and/or non-volatile (such as read-only memory (ROM), flash memory, etc.). The identity interface service computers 114 or servers may also include additional storage 126, which may include removable storage and/or non-removable storage. The additional storage 126 may include, but is not limited to, magnetic storage, optical disks, and/or tape storage. The disk drives and their associated computer-readable media may provide non-volatile storage of computer-readable instructions, data structures, program modules, and other data for the computing devices. In some implementations, the memory 122 may include multiple different types of memory, such as static random access memory (SLAM), dynamic random access memory (DRAM), or ROM.

The memory 122, the additional storage 126, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 122 and the additional storage 126 are all examples of computer storage media.

The identity interface service computers 114 may also contain communications connection(s) 128 that allow the service provider computers 110 to communicate with a stored database, another computing device or server, user terminals, and/or other devices on the networks 108. The identity interface service computers 114 may also include input/output (I/O) device(s) 130, such as a keyboard, a mouse, a pen, a voice input device, a touch input device, a display, speakers, a printer, etc.

Turning to the contents of the memory 122 in more detail, the memory 122 may include an operating system 132 and one or more application programs or services for implementing the features disclosed herein including a user application module 134, an REST interface module 136, and/or a replying party module 138. The user application module 134 may be configured to generate, host, or otherwise provide the identity console 118, and/or a website for accessing the identity console 118.

In some examples, the REST interface module 136 may be configured to provide a REST API, receive REST API calls, determine appropriate identity service and/or access management service method calls (i.e., API calls), provide the method calls, and/or perform instructions associated with the method calls. Similarly, the relying party module 138 may be configured to receive or determine the method calls, provide the method calls, and/or perform instructions associated with the method calls. In other words, the REST interface module 136 may be utilized for interacting with the client applications and/or user devices 104, while the relying party module 138 may be utilized for interacting with the service provider computers 110 and/or the identity service/access management computers 112.

By way of example, and without limitation, a client application of a user device 104 may transmit a REST API call for performing a particular identity management operation. The REST interface module 136 may receive the API call and determine (in some cases, based at least in part on a particular service provider 110 corresponding to the request) an appropriate method call for either the service provider computers 110 and/or the identity service/access management computers 112. In some examples, the REST interface module 136 may provide the pluggability of the identity interface service computers 114 by transmitting the method call to the identity service/access management computers 112 (which, in turn, may either respond to the identity interface service computers 114 via the relying party module 138 or communicate a response and/or instruction to the REST interface module 136, the service provider computers 110, and/or the enterprise solution computers 111). However, in other examples, the REST interface module 136 may instead transmit the REST API and/or the determined method call to the relying party module 138. The relying party module 138 may then provide the appropriate method call to the service provider computers 110 and/or the identity service/access management computers 112. Further, the relying party module 138 may also be configured to allow pluggability of the identity interface service computers 114, such that any number or type of service providers 110 and/or identity service/access management computers 112 may plug in to the identity interface computers 114 and rely on the identity interface computers 114 to interpret the REST calls of client applications on their behalf. A few examples of the operations of the identity interface service computers 114 are described in greater detail below with reference to at least FIGS. 2-11.

Additional types of computer storage media (which may also be non-transitory) that may be present in the identity interface service computers 114 may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tape, magnetic disk storage or other magnetic storage devices, or any other medium which can be used to store the desired information and which can be accessed by the service provider computers 110. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

Figure 2:
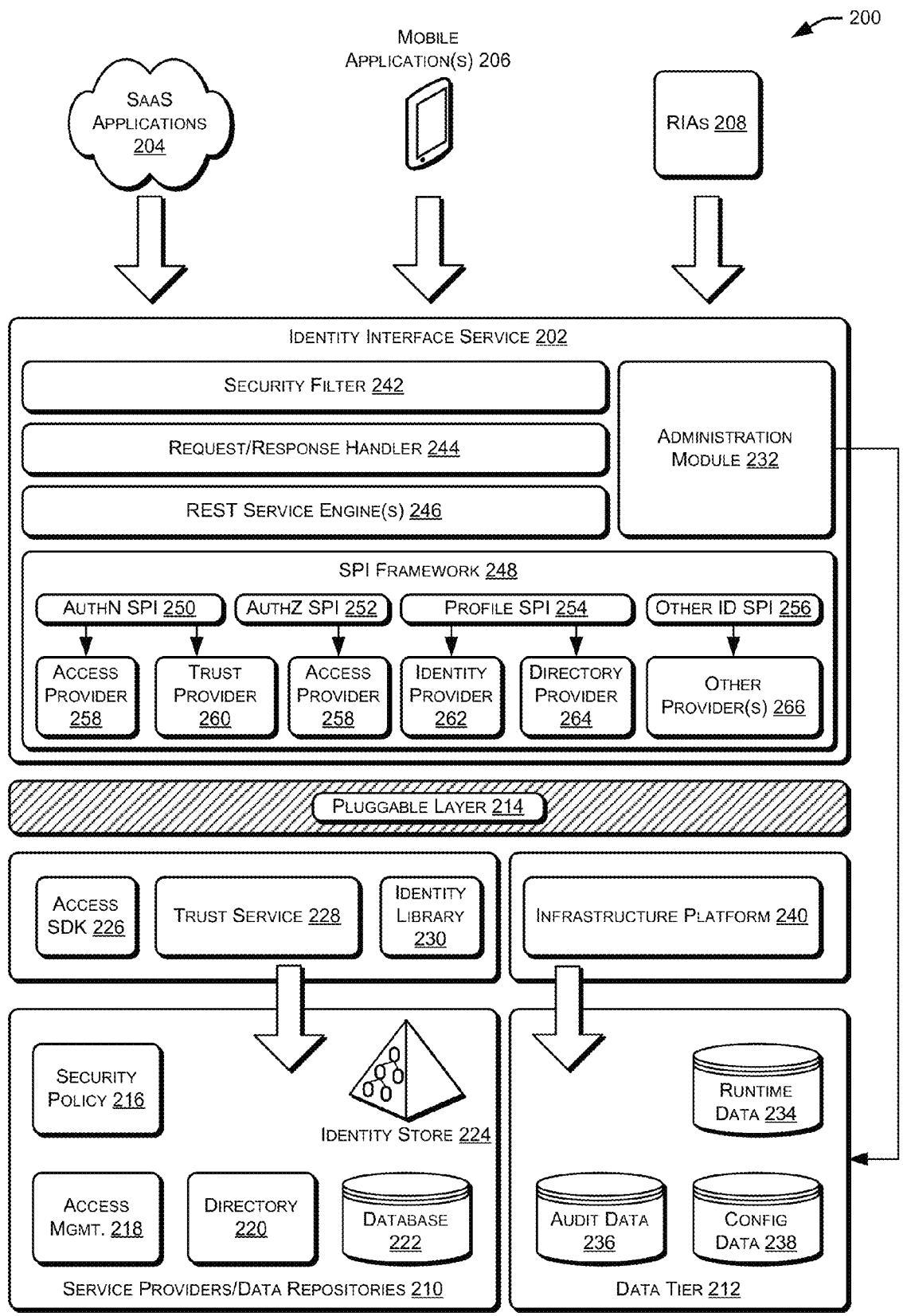
FIG. 2 is a simplified block diagram illustrating at least some features of the identity management described herein, according to at least one example.

As noted, in at least one example, one or more aspects of the environment or architecture 100 may incorporate and/or be incorporated into a distributed program execution service such as that hosted by the identity interface service computers 114. FIG. 2 depicts a simplified architecture 200 illustrating additional aspects and/or features of the identity interface service computers 114 of FIG. 1. For examples, FIG. 2 illustrates an identity interface service 202, such as that implemented by the identity interface service computers 114 of FIG. 1, receiving information, requests, and/or instructions from one or more client applications such as, but not limited to SaaS applications 204, mobile applications 206, and/or RIAs 208. As noted above, these requests may formatted, by the client applications 204, 206, 208, as REST calls and may be based at least in part on a REST API provided by the identity interface service 202. Additionally, the identity interface service 202 may in communication with one or more service providers/data repositories 210 and/or a data tier 212 via a pluggable layer 214. As noted above, by providing a pluggable layer 214, the one or more service providers/data repositories 210 may be added and/or removed to the service 202 on the fly and/or independent of the type of client application with which it may interact. In this way, the service 202 may maintain flexibility.

In some examples, the service providers/data repositories 210 may include one or more security policy services 216, access management services 218, directory services 220, databases 222, and/or identity stores 224 (e.g., LDAP servers). Additionally, according to some aspects, the service providers/data repositories 210 may be in communication with one or more pluggable services such as, but not limited to, an access software development kit (SDK) 226, a trust service 228, and/or an identity library 230. In some examples, the access SDK 226, the trust service 228, and/or the identity library 230 may collectively make up the interface layer for plugging the service providers/data repositories 210 into the identity interface service 202 via the pluggable layer 214. For example, the access SDK 226 may be responsible for plugging the access management service 218 into the service 202.

The identity interface service 202 may also include an administration module 232 for controlling, managing, or otherwise communicating with one or more runtime data stores 234, audit data stores 236, and/or configuration data stores 238 of the data tier 212. The data tier 212 may be in communication with the service 202 via an infrastructure platform 240 which may be configured to attach the data tier 212 as well as perform internal file management, logging, monitoring, and/or other administrative tasks. In some cases, the administration module 232 and the data tier 212 may be responsible for controlling, configuring, managing, and/or otherwise administering the services and/or data associated with the identity interface service 202. Additionally, the identity interface service 202 may also include a security filter 242, a request/response handler 244, one or more REST service engines 246, and/or a service provider interface (SPI) framework 248.

In some aspects, the security filter 242 may be configured to maintain the security of the REST API that is provided by the identity interface service 202. In this way, only authorized and/or authenticated client applications may be provided with the REST APIs and/or only API calls from authorized and/or authenticated client applications may be processed. The request/response handler 244 may be configured to receive requests from and provide responses to the client applications 204, 206, 208, etc. In some examples, the REST service engines 246 may be configured to govern policies of the identity interface service 202 such as, but not limited to, enforcing compliance with rules, enhancing infrastructure security, and/or streamlining service operations of the identity interface service 202.

Further, the SPI framework 248 may translate, map, or otherwise determine appropriate method calls and/or instructions for the service providers/data repositories 210. These method calls and/or instructions may be based at least in part on the REST API call received and/or the service provider with which the request is associated. For example, and without limitation, the request/response handler 244 may receive a request to update an identity relationship. The response may be formatted as a REST call from one of the client applications 204, 206, 208. The request/response handler 244 may forward the request to the SPI framework 248 where one or more different instructions or sets of instructions may be determined. For example, the instructions may be different depending on the service provider/data repository 210 for which the request was intended. That is, if the request was for a database 220, the SPI framework 248 may determine a different instruction (or set of instructions) for updating the identity relationship than if the request was for an LDAP identity store 224.

In some aspects, implementation of the SPI framework 248 may include utilizing one or more SPIs such as, but not limited to an authentication SPI 250, and authorization SPI 252, a profile SPI 254, and/or other ID SPIs 256. Additionally, the authentication SPI 250 may be configured to provide interaction with one or more access management providers 258 and/or one or more trust service providers 260. The authorization SPI 252 may be configured to provide interaction with the one or more access management providers 258. The profile SPI 254 may be configured to provide interaction with one or more identity service providers 262 and/or directory service providers 264. Further, the other ID SPI 256 may be configured to provide interaction with one or more other service providers 266 such as, but not limited to, password management services, policy management services, token exchange services, and/or user provisioning services. In this way, one or more individual SPIs may be responsible for communicating with the service providers/data repositories 210 via the pluggable layer 214. That is, the SPI framework 248 may act a proxy between the client applications 204, 206, 208 and the one or more service providers 210.

Figure 3:
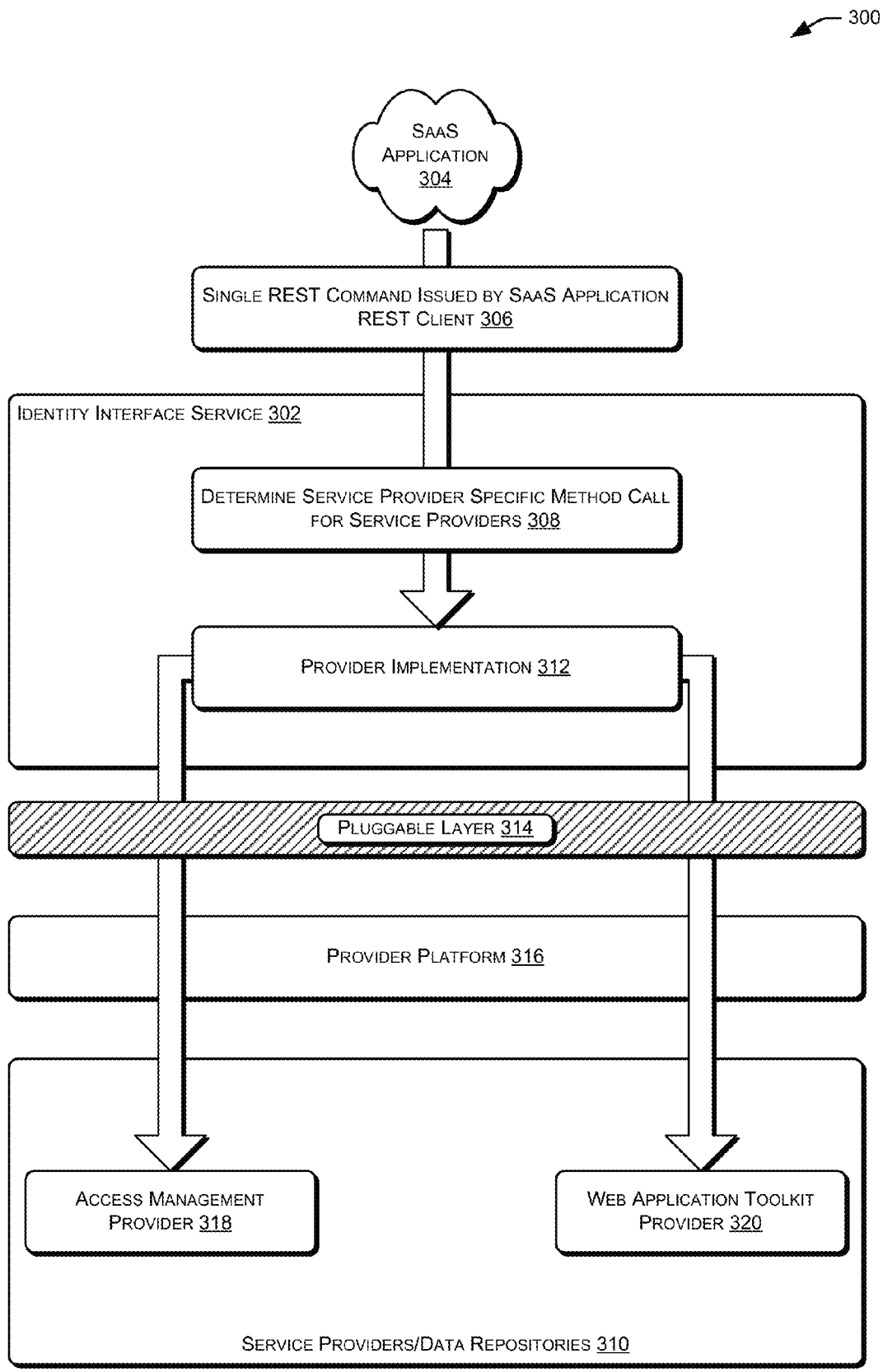
FIG. 3 is a simplified block diagram for illustrating a process flow of at least some features of the identity management described herein, according to at least one example.

FIG. 3 depicts a simplified example block diagram 300 illustrating one non-limiting process flow of the simplified example architecture 200 of FIG. 2 in which techniques for providing an identity interface service may be implemented.

In the simplified block diagram 300, aspects of the disclosure are shown again with reference to an identity interface service 302 such as, but not limited to, that described above with reference to the identity interface service 202 of FIG. 2 and/or the identity interface service computers 114 of FIG. 1. In some aspects a client application such as, but not limited to, a SaaS application 304 may send a single REST command via SaaS application REST client residing on a mobile device or other user device at 306. The identity interface service 302 may then determine a service provider specific method call for performing the received REST command at 308. As noted above, determining the method call, set of method calls, instructions, and/or set of instructions for the service provider (e.g., one or more service providers/data repositories 310) may be based at least in part on the corresponding service provider, an API of the corresponding service provider, and/or the specific command itself. As such, the single REST call of 306 may become one or more different service provider API method calls at the provider implementation 312 (e.g., the one or more SPIs of FIG. 2).

In some examples, via the pluggable layer 314, the identity interface service 302 may transmit the determined method calls and/or instructions to a provider platform 316. By way of example only, the provider platform 316 may include the access management SDK 226, the trust service 228, the identity library 230, and/or any APIs of the service providers described with reference to FIG. 2. As shown in FIG. 3, depending on the service provider with which the requested command is associated, the identity interface service 302 may provide a different implementation. For example, the provider implementation 312 may determine one set of method calls for an access management provider 318 and a different set of method calls for a web application toolkit provider 320. As such, from the single REST command received at 306, one more different method calls or sets of method calls may be provided to one or more different service providers. While method calls are shown being determined and provided to an access management provider 318 and a web application toolkit provider, it should be understood that other examples are possible without departing from the overall meaning of FIG. 3. For example, appropriate method calls may be provided to a security policy service provider, an identity propagation service provider, or any other identity service that may be deployed or otherwise operated on behalf of a service provider or enterprise solution.

Figure 4:
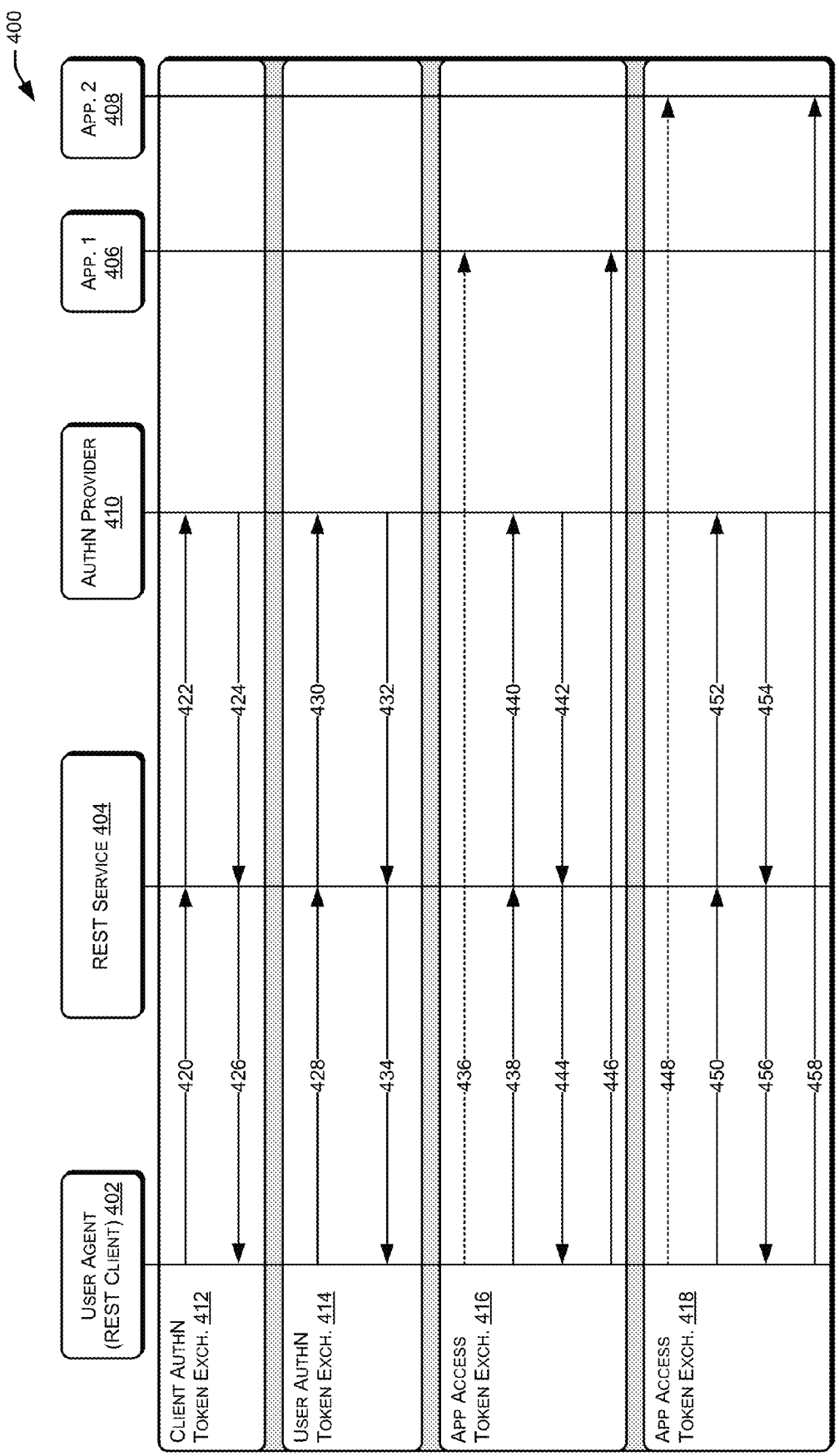
FIG. 4 is a simplified process flow diagram illustrating at least some features of the identity management described herein, according to at least one example.

FIG. 4 depicts a simplified process flow 400 of an example token interaction performed in conjunction with an identity interface service as described above. In some examples, the simplified process flow 400 may be performed by one or more computing devices such as, but not limited to, the identity interface service computers 114 of FIG. 1. In at least one example, a user agent 402 (e.g., a REST client or web client of a mobile device) may be in communication with a REST authentication service 404 (e.g., the identity interface service 202 of FIG. 2) and one or more computer applications and/or service providers (e.g., App 1 406 and/or App 2 408). Additionally, the REST service 404 may also be in communication with one or more service providers (e.g., an authentication service provider 410). In this example, at least four process stages may be identified including, but not limited to, a client authentication token exchange 412, a user authentication token exchange 414, a first application access token exchange 416, and a second application access token exchange 418. Additionally, in some examples, a portal may be utilized to interface between the user agent 402 and the REST service 404, such that REST service 404 may be invoked without the need for bundling any vendor specific (i.e., service provider specific) client components. Further, in some examples, an SDK may be utilized to appropriately communicate between the REST service 404 and the AuthN provider 410 (or any other service provider).

According to some aspects, the client authentication token exchange 412 may include attempting to acquire a client token indicating that the REST client 402 has been authenticated. At 420, the user agent 402 may transmit client credentials including, but not limited to, a client ID and a client password to the REST service 404. As discussed above at least with reference to FIG. 103, the REST service 404 may determine appropriate method calls for communicating with the one or more service providers. In this case, the REST service 404 is communicating with an AuthN service provider 410. As such, the REST service 404 may transmit the authentication request to the AuthN provider 410 at 422. In response, the AuthN provider 410 may provide an appropriate client token at 424 to the REST service 404. At 426, the REST service 404 may provide the client token to the user agent 402. Now that the client application (i.e., the user agent 402) has been authenticated, the user agent 402 may attempt to authenticate the user of the client application.

According to some aspects, the user authentication token exchange 414 may include attempting to acquire a user token indicating that the user of the REST client 402 has been authenticated. At 428, the user agent 402 may transmit the client token (previously received from the AuthN provider 410) and client credentials including, but not limited to, a client user ID and a client password. The REST service 404 may provide the user credentials and client token to the AuthN provider 410, according to the appropriately corresponding method calls, at 430. In response, the AuthN provider 410 may provide a client token to the REST service 404 at 432. At 434, the REST service 404 may provide the client token to the user agent 402.

The first and second application token exchanges 416, 418 may be similar to one another; however, in the first, an access request is being made for App 1 406, while in the second, an access request is being made for App 2 408. As such, the context (i.e., for which Application access is being requested) for each token exchange 416, 418 is different. At 436, the user agent 402 may transmit a GetToken request to App 1 406 with App 1 indicated as the context. In this way, in some examples, App 1 406 may indicate to the AuthN provider 410 the appropriate access token to be presented upon authentication. The user agent 402 may then transmit an access request to the REST service 404 at 438. The access request may include the client token and the user token (both previously received from the AuthN provider 410) and the appropriate context (here, App 1). At 440, the REST service 404 may provide the access request with the client token, user token, and context to the AuthN provider 410. Upon authentication by the AuthN provider 410, the AuthN provider 410 may provide an access token to the REST service at 442. The REST service 404 may then provide the access token to the user agent at 444 and the user agent 402 may then gain access to App 1 406 by providing the received access token at 446. In this way, the REST service 404 may act as a translator, proxy, or other interface for communication between the user agent (via REST calls) and the AuthN provider 410 (e.g., an enterprise solution that may not natively support calls from mobile applications).

The second application token exchange 418 may not differ much from the first application token exchange 416. However, the context will be different based at least in part on the fact that App 2 408 is different from App 1 406. Additionally, in some aspects, based at least in part on the different context, the method calls used by the REST service 404 may be different if a different AuthN provider 410 is used. That is, each Application 406, 408 may deploy or otherwise utilize a different AuthN provider 410. In any event, in some examples, the user agent 402 may transmit a GetToken request, at 448, to App 2 408 with App 2 indicated as the context. In this way, in some examples, App 2 408 may indicate to the AuthN provider 410 the appropriate access token to be presented upon authentication. The user agent 402 may then transmit an access request to the REST service 404 at 450. The access request may include the client token and the user token (both previously received from the AuthN provider 410) and the appropriate context (here, App 2). At 452, the REST service 404 may provide the access request with the client token, user token, and context to the AuthN provider 410. Upon authentication by the AuthN provider 410, the AuthN provider 410 may provide an access token to the REST service at 454. The REST service 404 may then provide the access token to the user agent at 456 and the user agent 4102 may then gain access to App 2 408 by providing the received access token at 458.

Figure 5:
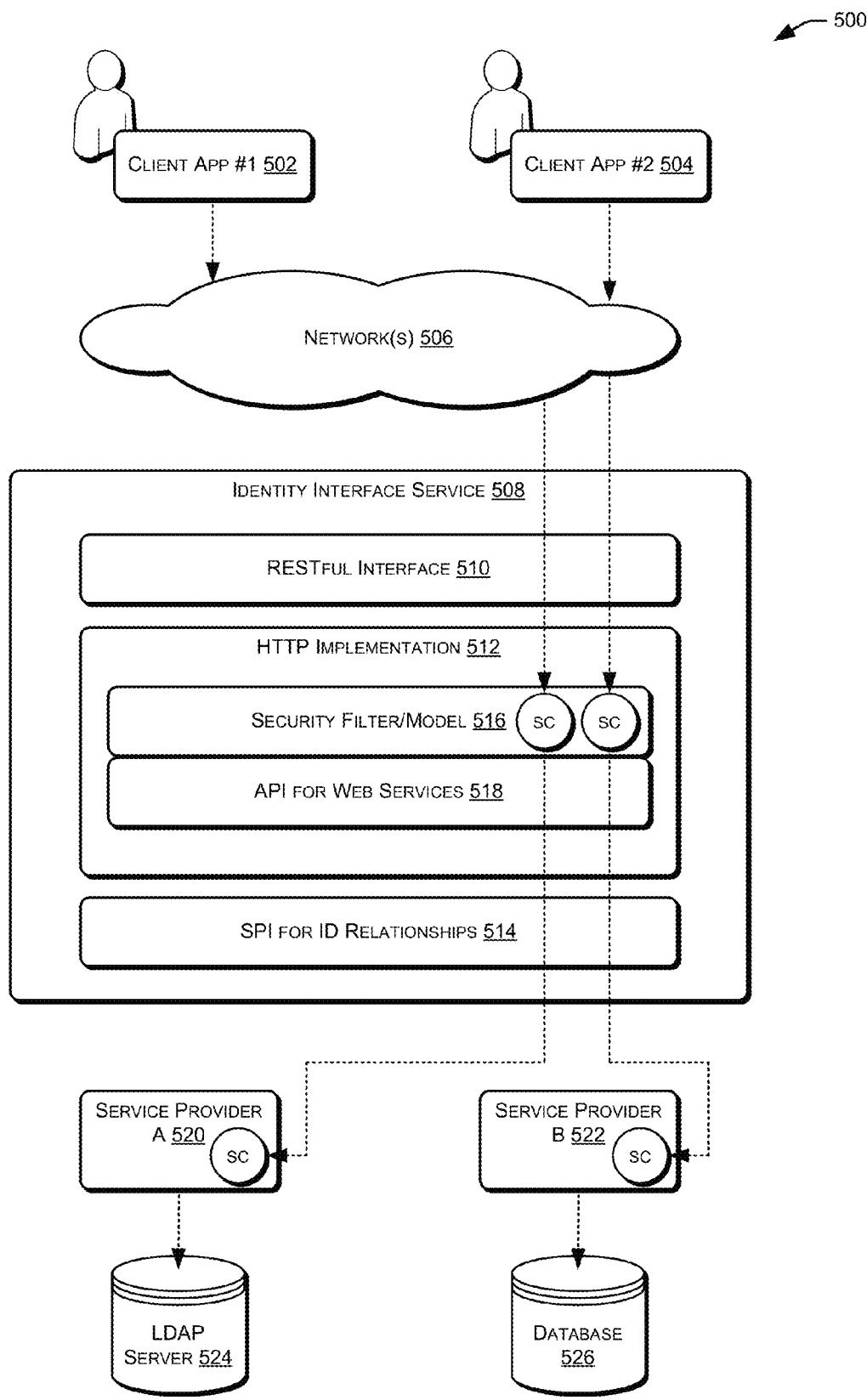
FIG. 5 is a simplified block diagram for illustrating at least some additional features of the identity management described herein, according to at least one example.

FIG. 5 depicts a simplified block diagram 500 illustrating an example process flow for implementing the identity interface services described herein to perform identity relationship management. As discussed above, identity relationship management may include defining, updating, and/or managing identity relationships. Additionally, as previously discussed, RESTful API calls may be utilized to make the identity relationship management requests. Further, in some examples, the identity relationships may be modeled, represented, or otherwise described using URIs and/or may be mapped to one or more different schemas including, but not limited to, LDAP schemas, relational database management system (RDBMS) schemas, etc. As used herein, a schema may include one or more language-defined structures or data organizational implementations of a storage device such as, but not limited to, a database, data store, etc.

In one non-limiting example, two different client applications, client App #1 502 and client App #2 504 may each transmit identity relationship management requests, via one or more networks 506, to an identity interface service 508. The identity interface service 508 may be any identity interface; however, in some examples, it may be implemented by the identity interface service computers 114 of FIG. 1. In some aspects, the identity interface service 508 may include a RESTful API interface 510, and HTTP implementation module 512, and/or an SPI for identity relationships module 514. Additionally, in some examples, the HTTP implementation module 512 may include a security filter/model module 516 and/or an API for web services module 518. The RESTful API interface 510 may, in some cases, be the layer with which client applications, users, and/or other external applications interact. As noted above, the identity relationships may be expressed as URIs and the interaction model may be through standard HTTP REST methods such as, but not limited to, GET, POST, PUT, and/or DELETE. In some cases, HTTP GET may be used to perform read and search operations on people and their relationship data, while POST, PUT, and DELETE may be utilized to manipulate and/or manage relationships. As such, the HTTP implementation module 512 may be configured to translate or otherwise interpret the received HTTP calls.

For example, an orgchart may be expressed as URIs similar to " . . . /people/alice/reports," and " . . . /people/alice/manager." These two URIs may represent two sets of relationships: one from "alice" to her "reports," the other from "alice" to her "manager." Additionally, among relationships from "alice" to her "reports," a particular instance of relationship may be pinpointed with a URI as " . . . /people/alice/reports/bob." This URI may represent the relationship between "alice" and "bob" of the "reports" criteria. Further, the people entity data and people relationship data may be accessed through a consistent interface, which may be based on HTTP or other protocols. In this way, the interface may stay the same regardless of the types of backend identity repository technology stacks used (e.g., different types of LDAP servers and their LDAP schemas and/or RDBMS schemas), as the service providers may map these people and their relationships.

Additionally, in some examples, the identity interface service 508 may also include an SPI module 514 for allowing data sources to plug in. In some examples, the SPI module 514 may include logic that coordinates interactions between the HTTP layer and the provider layers. For example, different provider implementations (e.g., service provider A 520 and/or service provider B 522) may have their own custom logic to interact with different data stores (e.g., various types of LDAP servers 524, a virtual LDAP directory, or an RDBMS database 526). In some cases, each of these data stores may have its own schema and its own attributes. For example, custom logic within a service provider may deal with differences in network protocols and/or differences in schema definitions. Further, these kinds of custom logic implementations may be responsible for providing a relatively consistent behavior across different service providers for the HTTP layer to invoke.

As noted, the HTTP implementation module 512 may include the security filter/model module 516 and/or the API for web services module 518. In some cases, the security filter/model module 516 may be configured to centralize the validation and logic of one or more types of HTTP headers. For example, client application and/or user authorization headers may be included with the received URIs to indicate that a particular HTTP request may carry the authorization privilege/permissions of a particular user or client application. Once header values are validated by the security filter/model module 516, a security context, "SC," may be constructed based at least in part on the verified user identity and/or client application identity. The security filter logic, in some examples, may consult some authorization policy (which may be coarse-grain or fine-grain) to check whether the verified user identity and/or client application identity have enough permission and privilege to continue the operation targeted by the particular HTTP request. Additionally, in some examples, this authorization decision may be offloaded and/or delegated to another authorization service. The security context, "SC," may then be propagated further to various components on the server side, including different service provider implementations (e.g., service providers A and/or B 520, 522) that retrieve and/or manage identity relationship data. While two client Apps 502, 504 and two service providers 520, 522 are shown in FIG. 5, other configurations (including those with more or less client applications and/or service providers) are possible as well.

Further, the example architectures, tools, and computing devices shown in FIGS. 1-5 are provided by way of example only. Numerous other operating environments, system architectures, and device configurations are possible. Accordingly, embodiments of the present disclosure should not be construed as being limited to any particular operating environment, system architecture, or device configuration.

Illustrative Processes

FIGS. 6-11 illustrate simplified example flow diagrams showing respective processes 600, 700, 800, 900, 1000, and 1100 for providing identity interface services. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

Figure 6:
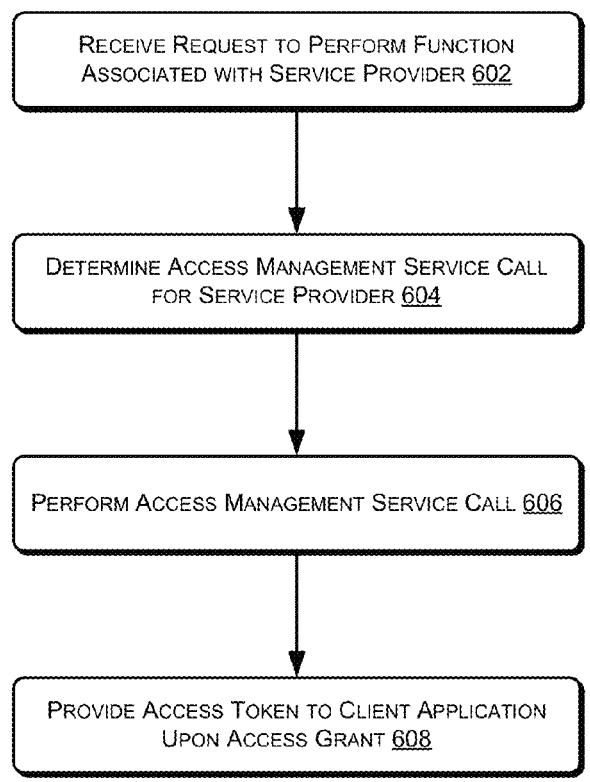
FIGS. 6-11 are simplified flow diagrams illustrating example processes for implementing at least some features of the identity management described herein, according to at least a few examples.

In some aspects, the process 600 of FIG. 6 may be performed by the one or more identity interface service computers 114 shown in FIG. 1. The process 600 may begin by receiving a request to perform a function associated with a service provider at 602. As noted above, the service provider may include, but is not limited to, an identity service, an access management service, a token exchange service, an enterprise solution, combinations of the foregoing, or the like. Additionally, the function to be performed may be any function of the one or more service providers such as, but not limited to, an access request, an identity relationship management request, an authentication request, an authorization request, etc. At 604, the process 600 may determine an access management service call for the service provider. That is, a particular method call or custom logic for an access management service provider may be determined. The method call for the access management service (i.e., the access management service call) may be for performing and/or communicating instructions for performing the requested function. The process 600 may then perform the determined method call (e.g., by passing the appropriate parameters to the service provider) at 606. The process 600 may then end at 608 by providing an access token to the client application upon receiving an indication that access has been (or should be) given to the client application.

Figure 7:
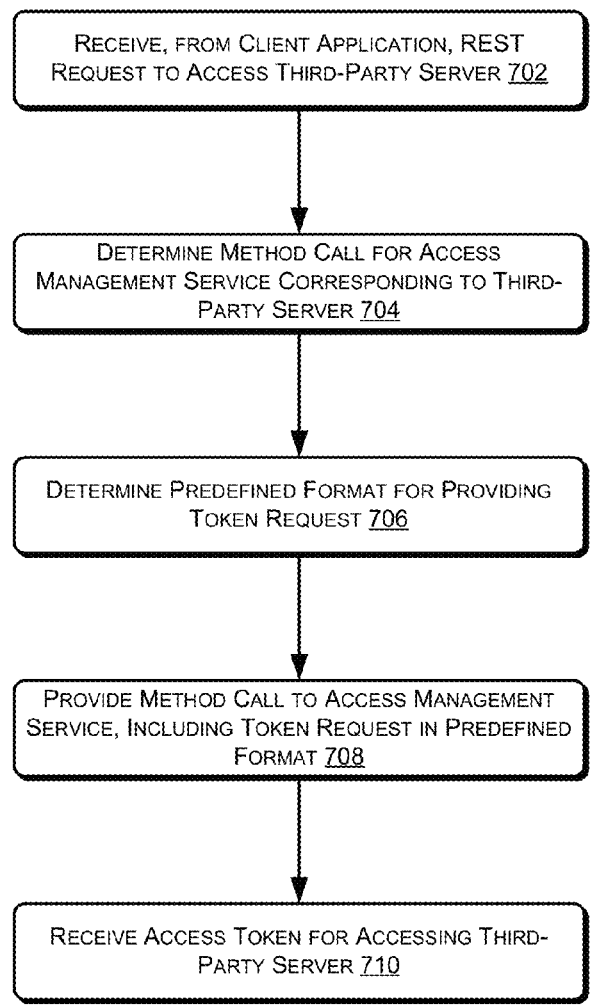

FIG. 7 illustrates a simplified example flow diagram showing the process 700 for providing features of an identity interface service. In some aspects, the process 700 of FIG. 7 may be performed by the one or more identity interface service computers 114 shown in FIG. 1. The process 700 may begin by receiving, from a client application, a REST request to access a third-party server at 702. The process 700 may also determine an appropriate method call for accessing an access management service corresponding to the third-party server at 704. As noted above, the appropriate method call (or custom logic) may be based at least in part on an API of the third-party server for which access is being requested or based at least in part on an API of the access management service. At 706, the process 700 may determine a predefined format for providing a token request. That is, each access management service and/or service provider may expect requests to be formatted in a particular way and/or based on a particular schema. At 706, the process 700 may determine this format and/or schema. The process 700 may, at 708, provide a method call to the access management service. The method call may, in some examples, include the token request in the predefined format. The process 700 may end at 710 by receiving an access token for accessing the third-party server. This access token, in some cases, may be provided to the client application.

Figure 8:
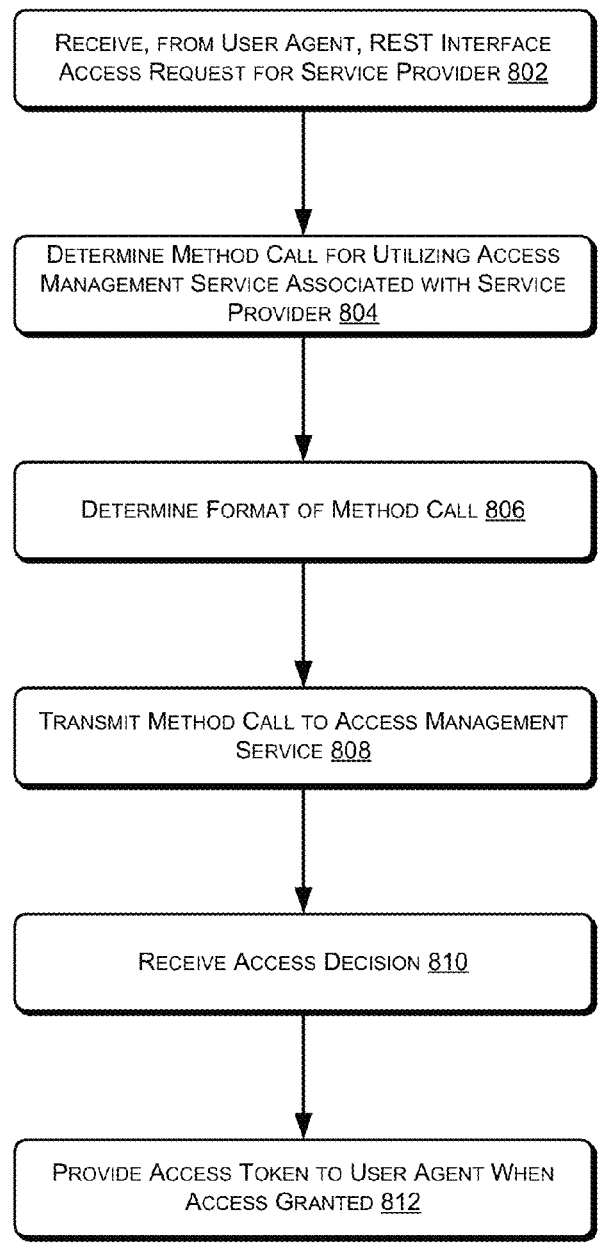

FIG. 8 illustrates a simplified example flow diagram showing the process 800 for providing features of an identity interface service. In some aspects, the process 800 of FIG. 8 may be performed by the one or more identity interface service computers 114 shown in FIG. 1. The process 800 may begin by receiving, from a user agent, a REST interface request for accessing a service provider at 802. The process 800 may also determine an appropriate method call for utilizing an access management service associated with the service provider at 804. As noted above, the appropriate method call (or custom logic) may be based at least in part on an API of the service provider for which access is being requested or based at least in part on an API of the access management service. At 806, the process 800 may determine a format for providing the method call. That is, each access management service and/or service provider may expect requests to be formatted in a particular way and/or based on a particular schema. At 806, the process 800 may determine this format and/or schema. The process 800 may, at 808, transmit the method call (e.g., in the determined format) to an access management service. The process 800 may receive an access decision at 810 and end at 812 by providing an access token to the user agent when access is granted. This access token, in some cases, may be provided to the user agent.

Figure 9:
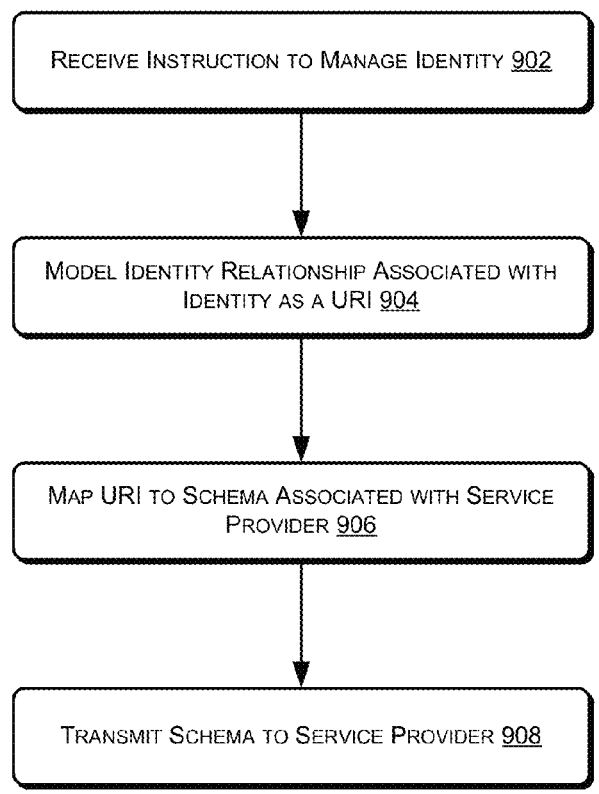

FIG. 9 illustrates a simplified example flow diagram showing the process 900 for providing features of an identity interface service. In some aspects, the process 900 of FIG. 9 may be performed by the one or more identity interface service computers 114 shown in FIG. 1. The process 900 may begin by receiving an instruction to manage an identity at 902. At 904, the process 900 may model an identity relationship associated with the identity as a URI. In some examples, this modeling may include receiving the identity information as a URI. However, in other examples, the modeling may include generating a URI based at least in part on the received identity. The process 900 may map the URI to a schema associated with a service provider at 906. At 908, the method 900 may end by transmitting the schema to the service provider.

Figure 10:
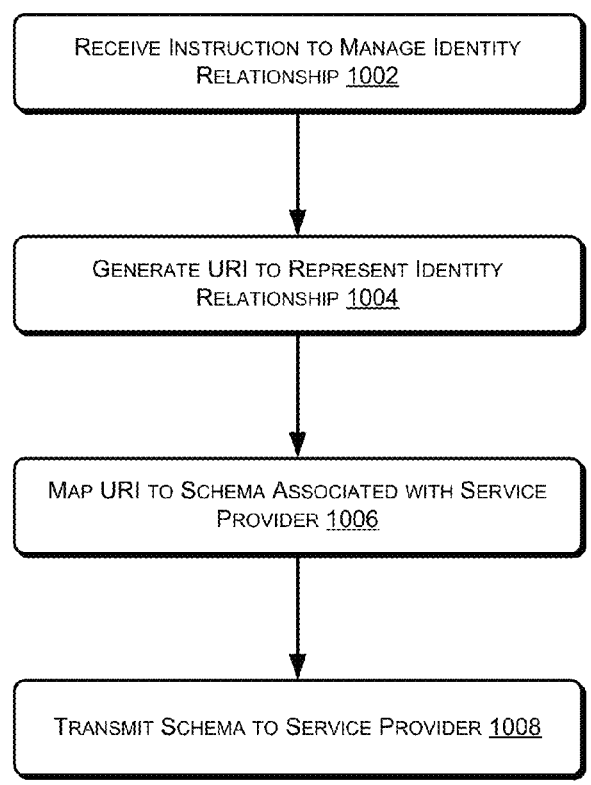

FIG. 10 illustrates a simplified example flow diagram showing the process 1000 for providing features of an identity interface service. In some aspects, the process 1000 of FIG. 10 may be performed by the one or more identity interface service computers 114 shown in FIG. 1. The process 1000 may begin by receiving an instruction to manage an identity relationship at 1002. The process 1000 may generate a URI to represent the identity relationship at 1004. At 1006, the process 1000 may map the URI to a schema associated with a particular service provider. The process 1000 may end at 1008 by transmitting the schema to the particular service provider.

Figure 11:
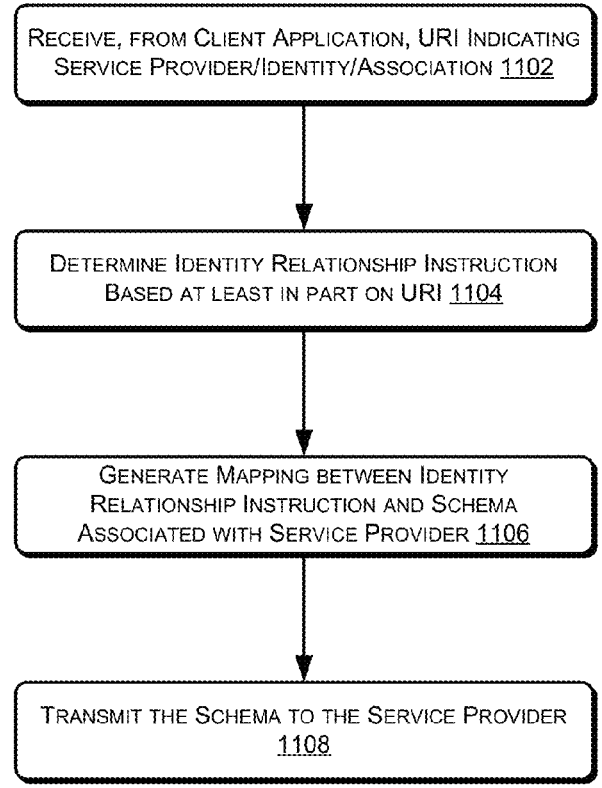

FIG. 11 illustrates a simplified example flow diagram showing the process 1100 for providing features of an identity interface service. In some aspects, the process 1100 of FIG. 11 may be performed by the one or more identity interface service computers 114 shown in FIG. 1. The process 1100 may begin by receiving, from a client application, a URI indicating a service provider, an identity, and an association at 1102. In some examples, the service provider indicated in the URI provides the context for which an identity relationship management instruction is to be performed. For example, the indicated service provider may manage or otherwise store the identity information. Additionally, the association indicated in the URI may identify one or more relationship associations between the indicated identity and one or more other entities. At 1104, the process 1100 may determine an identity relationship instruction based at least in part on the URI. That is, from the format, layout, order, and/or schema of the URI, the process 1100 may be able to determine the instruction being requested by the client application. The process 1100 may generate a mapping between the identity relationship instruction and a schema associated with a particular service provider at 1106. The process 1100 may end at 1108 by transmitting the schema to the service provider and/or transmitting the instruction formatted according to the determined schema to the service provider.

Illustrative Systems

Figure 12:
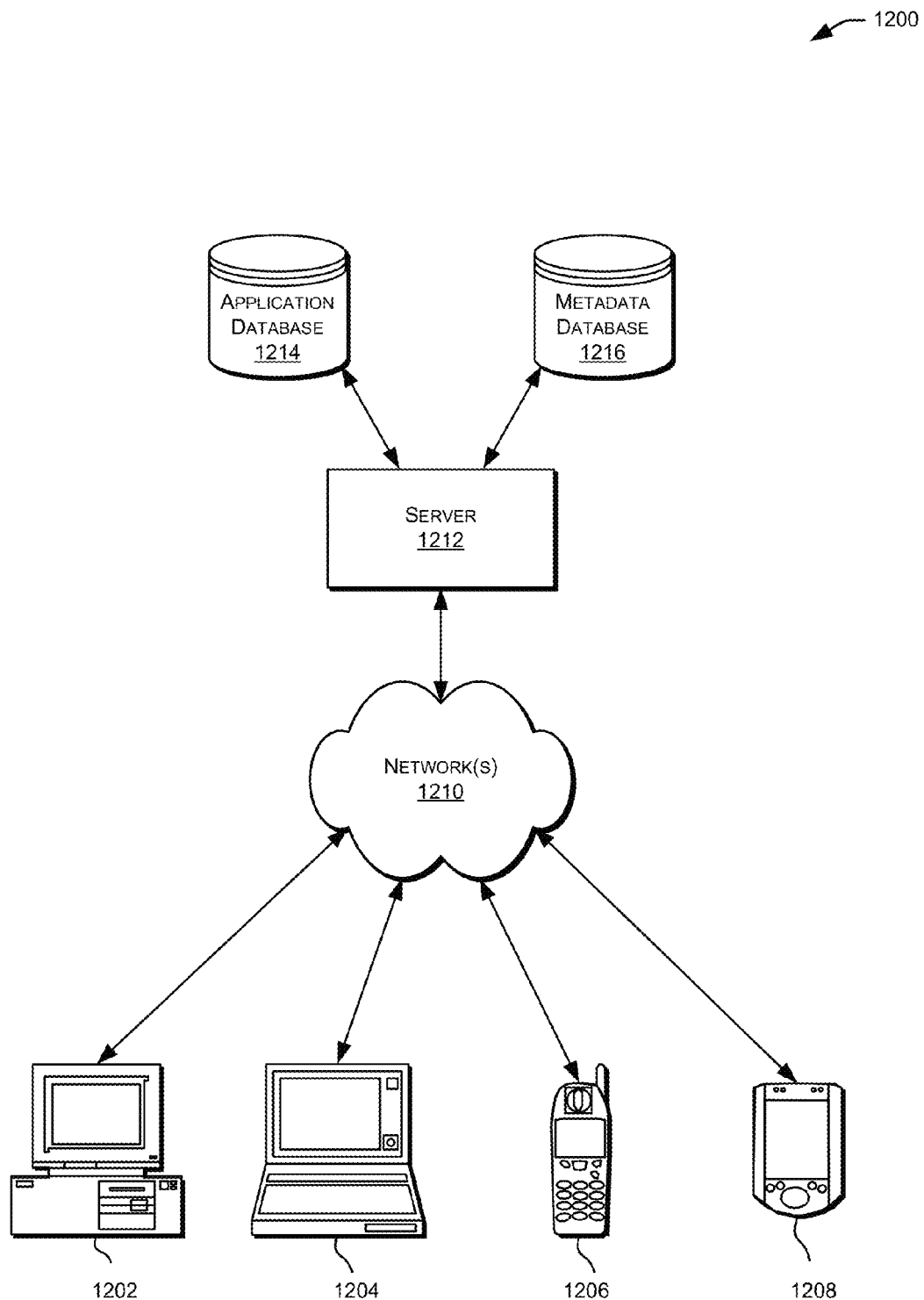
FIG. 12 is a simplified block diagram illustrating components of a system environment that may be used in accordance with an embodiment of the identity management described herein, according to at least one example.

FIG. 12 is a simplified block diagram illustrating components of a system environment 1200 that may be used in accordance with an embodiment of the present invention. As shown, system environment 1200 includes one or more client computing devices 1202, 1204, 1206, 1208, which are configured to operate a client application such as a web browser, proprietary client (e.g., Oracle Forms), or the like. In various embodiments, client computing devices 1202, 1204, 1206, and 1208 may interact with a server 1212.

Client computing devices 1202, 1204, 1206, 1208 may be general purpose personal computers (including, by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 1202, 1204, 1206, and 1208 may be any other electronic device, such as a thin-client computer, Internet-enabled gaming system, and/or personal messaging device, capable of communicating over a network (e.g., network 1210 described below). Although exemplary system environment 1200 is shown with four client computing devices, any number of client computing devices may be supported. Other devices such as devices with sensors, etc. may interact with server 1212.

System environment 1200 may include a network 1210. Network 1210 may be any type of network familiar to those skilled in the art that can support data communications using any of a variety of commercially-available protocols, including without limitation TCP/IP, SNA, IPX, AppleTalk, and the like. Merely by way of example, network 1210 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 1200 also includes one or more server computers 1212 which may be general purpose computers, specialized server computers (including, by way of example, PC servers, UNIX servers, mid-range servers, mainframe computers, rack-mounted servers, etc.), server farms, server clusters, or any other appropriate arrangement and/or combination. In various embodiments, server 1212 may be adapted to run one or more services or software applications described in the foregoing disclosure. For example, server 212 may correspond to a server for performing processing described above according to an embodiment of the present invention.

Server 1212 may run an operating system including any of those discussed above, as well as any commercially available server operating system. Server 1212 may also run any of a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

System environment 1200 may also include one or more databases 1214, 1216. Databases 1214, 1216 may reside in a variety of locations. By way of example, one or more of databases 1214, 1216 may reside on a non-transitory storage medium local to (and/or resident in) server 1212. Alternatively, databases 1214, 1216 may be remote from server 1212, and in communication with server 1212 via a network-based or dedicated connection. In one set of embodiments, databases 1214, 1216 may reside in a storage-area network (SAN) familiar to those skilled in the art. Similarly, any necessary files for performing the functions attributed to server 1212 may be stored locally on server 1212 and/or remotely, as appropriate. In one set of embodiments, databases 1214, 1216 may include relational databases, such as databases provided by Oracle, that are adapted to store, update, and retrieve data in response to SQL-formatted commands.

Figure 13:
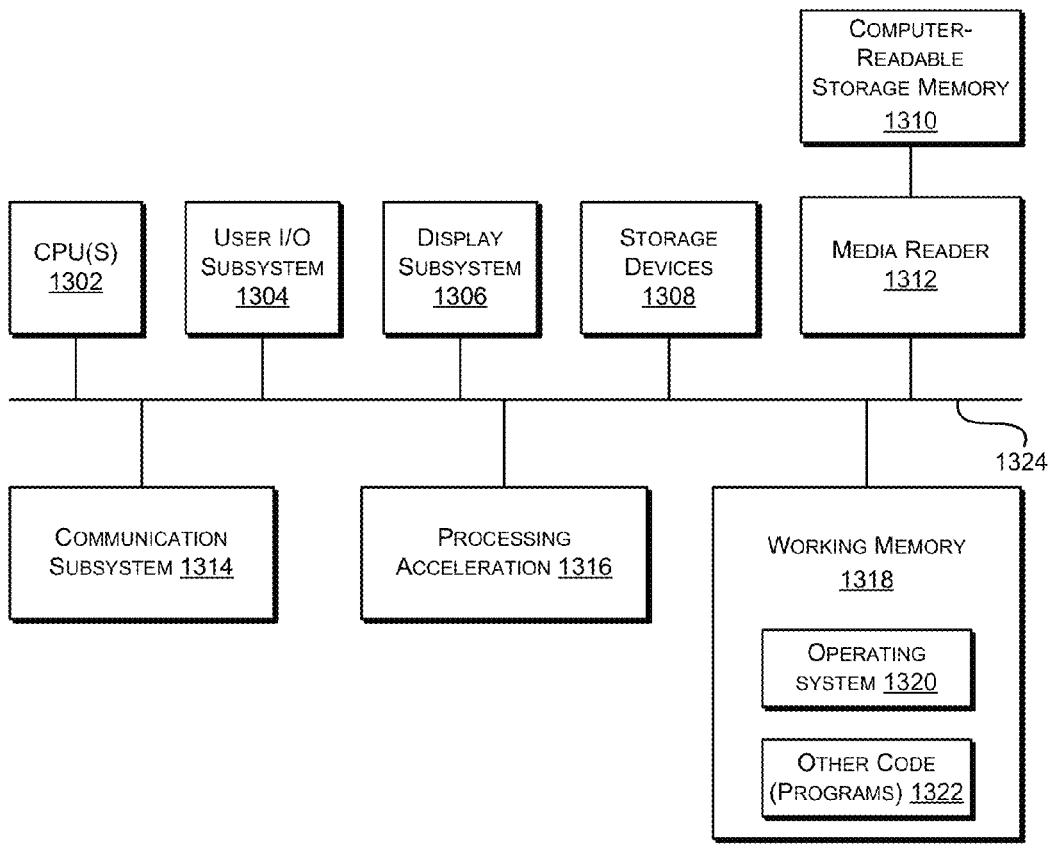
FIG. 13 is a simplified block diagram illustrating a computer system that may be used in accordance with embodiments of the identity management described herein, according to at least one example.

FIG. 13 is a simplified block diagram of a computer system 1300 that may be used in accordance with embodiments of the present invention. For example servers 114 and/or 1212 may be implemented using a system such as system 1300. Computer system 1300 is shown comprising hardware elements that may be electrically coupled via a bus 1324. The hardware elements may include one or more central processing units (CPUs) 1302, one or more input devices 1304 (e.g., a mouse, a keyboard, etc.), and one or more output devices 1306 (e.g., a display device, a printer, etc.). Computer system 1300 may also include one or more storage devices 1308. By way of example, the storage device(s) 1308 may include devices such as disk drives, optical storage devices, and solid-state storage devices such as a random access memory (RAM) and/or a read-only memory (ROM), which can be programmable, flash-updateable and/or the like.

Computer system 1300 may additionally include a computer-readable storage media reader 1312, a communications subsystem 1314 (e.g., a modem, a network card (wireless or wired), an infra-red communication device, etc.), and working memory 1318, which may include RAM and ROM devices as described above. In some embodiments, computer system 1300 may also include a processing acceleration unit 1316, which can include a digital signal processor (DSP), a special-purpose processor, and/or the like.

Computer-readable storage media reader 1312 can further be connected to a computer-readable storage medium 1310, together (and, optionally, in combination with storage device (s) 1308) comprehensively representing remote, local, fixed, and/or removable storage devices plus storage media for temporarily and/or more permanently containing computer-readable information. Communications system 1314 may permit data to be exchanged with network 1212 and/or any other computer described above with respect to system environment 1300.

Computer system 1300 may also comprise software elements, shown as being currently located within working memory 1318, including an operating system 1320 and/or other code 1322, such as an application program (which may be a client application, Web browser, mid-tier application, RDBMS, etc.). In an exemplary embodiment, working memory 1318 may include executable code and associated data structures used for relying party and open authorization-related processing as described above. It should be appreciated that alternative embodiments of computer system 1300 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile (non-transitory), removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by a computer.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope.

Illustrative methods and systems for providing statistically triggered data placement are described above. Some or all of these systems and methods may, but need not, be implemented at least partially by architectures such as those shown in FIGS. 1-9 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
a memory storing a plurality of instructions; and
one or more hardware processors configured to access the memory, wherein the one or more hardware processors are further configured to execute the plurality of instructions to:
receive, from a mobile client application of a mobile device, an access request requesting access to an access management service provider, the access request formatted as a representational state transfer (REST) call;
determine, based at least in part on the REST call, an access management service call for accessing an access management service corresponding to the access management service provider;
determine a format for providing the access management service call based on a Lightweight Directory Access Protocol (LDAP) schema associated with the access management service provider;
perform the access management service call in accordance with the determined format, the access management service call including a token request specified in the determined format for accessing the access management service provider, the token request including a mobile client token and a user token;
receive an access token for accessing the access management service provider based at least in part on the mobile client token and the user token; and
cause the mobile client application to perform a function associated with the access management service provider based on the received access token upon authentication of a user of the mobile client application.

2. The system of claim 1, wherein the client application comprises a software as a service (SaaS) application, or a Rich Internet Application (RIA).

3. The system of claim 1, wherein the access request comprises an authentication request, an authorization request, a user profile management request, a policy management request, or a password management request.

4. The system of claim 3, wherein the authentication request includes a user identifier (ID) associated with the user of the mobile client application, a password associated with the user of the mobile client application, and the mobile client token for indicating that the mobile client application is authenticated, the user ID and the password for authenticating the user with the access management service.

5. The system of claim 1, wherein the access management service call comprises a method call to implement a token exchange.

6. The system of claim 1, wherein the access request further includes an indication of the access management service provider for which access is requested, wherein the mobile client token indicates that the mobile client application is authenticated and the user token indicates that the user of the mobile client application is authenticated.

7. The system of claim 6, wherein the one or more hardware processors are further configured to provide the access token to the mobile client application at least in response to receiving an indication that the user and the client application are granted access to the access management service provider by the access management service.

8. The system of claim 1, wherein a first access management service call corresponding to a first service provider is different from a second access management service call corresponding to a second service provider.

9. The system of claim 1, wherein the access management service to be used is specified by the access management service provider and not indicated to the client application.

10. A computer-implemented method, comprising:
receiving, by a computer system, a representational state transfer (REST) interface access request for accessing a third-party server, the REST interface access request received from a mobile client application;
determining, by the computer system, an access management service call corresponding to the third-party server for which access is requested, the determining based at least in part on the REST interface access request received from the mobile client application;
determining, by the computer system, a format for providing the access management service call based on a Lightweight Directory Access Protocol (LDAP) schema associated with the access management service provider;
providing, by the computer system, the access management service call in accordance with the determined format to an access management service associated with the third-party server for which access is requested, the access management service call including a token request specified in the determined format for accessing the third-party server, the token request including a mobile client token and a user token;
receiving, by the computer system, an access token for accessing the third-party server based at least in part on the mobile client token and the user token;
providing, by the computer system, the access token to the mobile client application; and
causing the mobile client application to perform a function associated with the access management service provider based on the received access token upon authentication of a user of the mobile client application.

11. The computer-implemented method of claim 10, wherein the client application comprises a rich Internet application, or a software as a service application.

12. The computer-implemented method of claim 10, wherein the request to access the third-party server is received as a REST call independent of an application programming interface (API) of the third-party server for which access is requested.

13. The computer-implemented method of claim 10, further comprising determining, based at least in part on an application programming interface (API) of the third-party server, a predefined manner for providing the token request.

14. A computer-readable memory storing a plurality of instructions executable by one or more hardware processors, the plurality of instructions comprising:
instructions that cause the one or more hardware processors to receive, from a mobile client application, a representational state transfer (REST) interface call for requesting access to a service provider;
instructions that cause the one or more hardware processors to determine, based at least in part on the REST interface call from the mobile client application, a method call for utilizing an access management service associated with the service provider;
instructions that cause the one or more hardware processors to determine a format for providing the method call based on a Lightweight Directory Access Protocol (LDAP) schema associated with the service provider;
instructions that cause the one or more hardware processors to transmit, to the access management service associated with the service provider, the method call for utilizing the access management service in accordance with the determined format, the method call including a token request specified in the determined format for accessing the service provider, the token request including a mobile client token and a user token;
instructions that cause the one or more hardware processors to receive, from the access management service, an access decision based on the mobile client token and the user token; and
instructions that cause the one or more hardware processors to provide, based at least in part on the access decision, an access token to the mobile client application so that the mobile client application can perform a function associated with the access management service provider based on the received access token upon authentication of a user of the mobile client application.

15. The computer-readable memory of claim 14, wherein the REST interface call for requesting access to the service provider includes at least a request to authenticate the user of the mobile client application.

16. The computer-readable memory of claim 14, further comprising instructions that cause the one or more hardware processors to determine the format for transmission of the method call based at least in part on an application programming interface (API) of the access management service.

17. The computer-readable memory of claim 16, wherein a first format of a method call for a first access management service is different from a second format of a method call for a second access management service.

18. The computer-readable memory of claim 14, wherein the access management service is configured to receive method calls other than REST interface calls.

19. The computer-readable memory of claim 14, wherein the method call comprises a request to authenticate the user of the mobile client application, a request to authorize the user of the mobile client application, or a request to perform a token exchange for providing user access to the service provider.

* * * * *

UNITED STATES PATENT AND TRADEMARK OFFICE
CERTIFICATE OF CORRECTION

| | | |
|---|---|---|
| PATENT NO. | : 9,081,951 B2 | Page 1 of 1 |
| APPLICATION NO. | : 13/485509 | |
| DATED | : July 14, 2015 | |
| INVENTOR(S) | : Sondhi et al. | |

It is certified that error appears in the above-identified patent and that said Letters Patent is hereby corrected as shown below:

In the Specification

In column 5, line 34, delete "al low" and insert -- allow --, therefor.

In column 9, line 59, delete "(SLAM)," and insert -- (SRAM), --, therefor.

In column 15, line 19, delete "4102" and insert -- 402 --, therefor.

In column 20, line 1, delete "212" and insert -- 1212 --, therefor.

Signed and Sealed this
Twenty-first Day of June, 2016

Michelle K. Lee
*Director of the United States Patent and Trademark Office*